United States Patent [19]
Mungons

[11] Patent Number: 4,512,682
[45] Date of Patent: Apr. 23, 1985

[54] ALIGNMENT CONTROL DEVICE

[76] Inventor: Edwin M. Mungons, 5906 Cresthaven (Apt. D-1), Toledo, Ohio 43614

[21] Appl. No.: 511,920

[22] Filed: Jul. 8, 1983

Related U.S. Application Data

[63] Continuation-in-part of Ser. No. 418,405, Sep. 15, 1982.

[51] Int. Cl.$^3$ ............................................. F16B 7/00
[52] U.S. Cl. ................................. 403/390; 403/393
[58] Field of Search ........................ 403/388, 393, 390

[56] References Cited

U.S. PATENT DOCUMENTS

| | | | |
|---|---|---|---|
| 686,711 | 11/1901 | Cain | 403/393 X |
| 3,281,164 | 10/1966 | Reaser | 403/388 X |
| 4,414,706 | 11/1983 | Douglas | 403/388 X |

FOREIGN PATENT DOCUMENTS

| | | | |
|---|---|---|---|
| 2142621 | 3/1973 | Fed. Rep. of Germany | 403/388 |

*Primary Examiner*—Andrew V. Kundrat
*Attorney, Agent, or Firm*—George R. Royer

[57] ABSTRACT

The subject invention is a device for vertically connecting members relative to one another in order to prevent rotational movement relative to one another, and wherein the invention resides in an adapter plate structured to be sandwiched intermediate the upper surface of the lower connected member and the lower surface of the upper connected member. The adapter member is generally comprised of a rectangularly shaped plate member having on opposite sides thereof reverse flange projections, one such projection structured to ride down along the vertical wall of the lower connected member; with the opposite flange structured to ride vertically up the vertical wall of the upper connected member, or vice versa. An opening is structured in the plate to receive a portion of a bolt member, which may be used to interconnect the two members.

1 Claim, 5 Drawing Figures

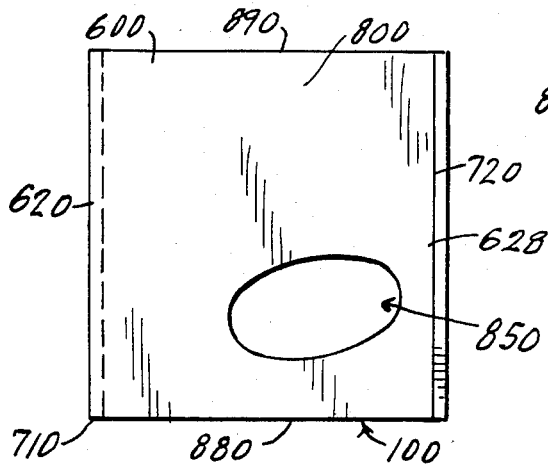
FIG-1-
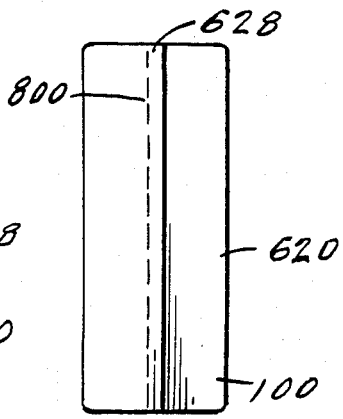
FIG-2-
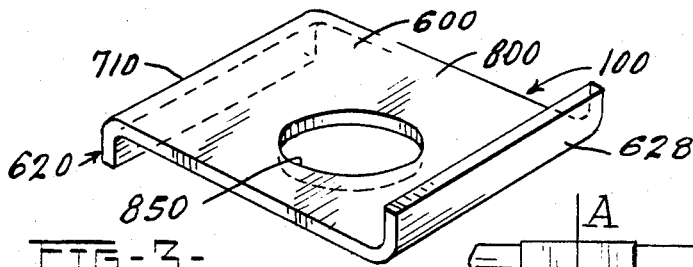
FIG-3-
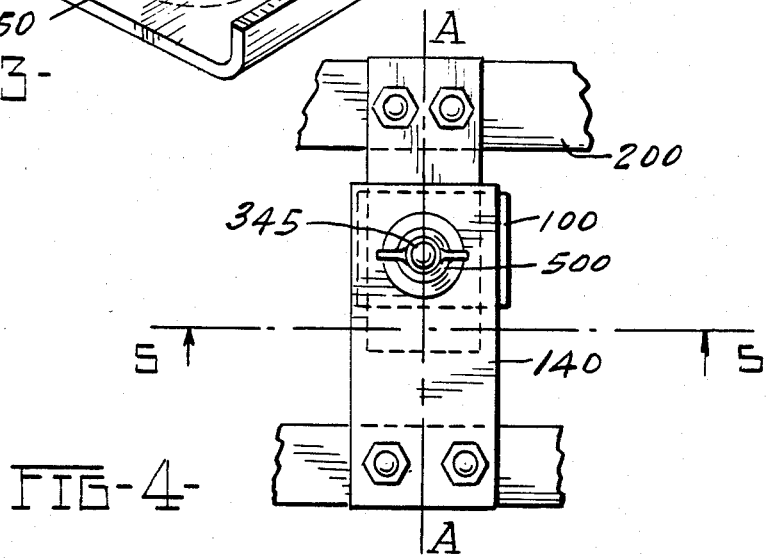
FIG-4-
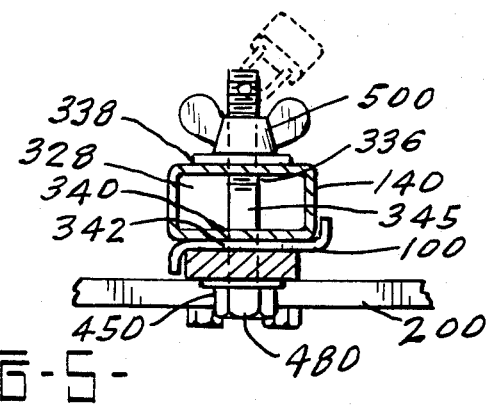
FIG-5-

ALIGNMENT CONTROL DEVICE

BACKGROUND OF INVENTION AND DISCUSSION OF PRIOR ART

Continuation in part of my pending application Ser. No. 06/418,405 filed Sept. 15, 1982.

The invention herein pertains to externally attached carriers and objects adapted for rigid or semi-rigid connection to each other, such as a portion of a vehicle which is adapted to bear various objects external to the vehicle or serve various other carrying functions. The field of art to which this invention relates includes a wide array of devices, with the subject invention being an adapter used to facilitate and enhance connection of a carrier or other object to a portion of the vehicle.

The general category of externally attached carriers, which are generally appended to the rear of vehicles are adapted to carry various object such as bicycles, similar vehicles, or a miscellaneous array of subjects. It is abundantly clear that there exists in the existing state of the art quite a wide variety of externally attached carriers adapted for carrying objects. The invention herein provides a unique structural arrangement for stabilizing an external carrier or other object to a portion of the vehicle in such a manner as to prevent slippage or rotation.

It is noted, in this respect, that automobiles have been used almost from their inception to carry objects on the outside of the motor vehicle under diverse conditions. Certain items are either too large or too cumbersome to be carried in the passenger compartment, the vehicle trunk, or other areas normally appurtenant to the vehicle. In many situations, rooftop carriers are utilized, but such carriers have limited potential use, particularly in view of the need to hoist the carried object up or down off the vehicle roof as required. Additionally, vehicles have been rigged to carry objects on the front or side of the automobile, using in such situations external appurtenances to hold the object astride the vehicle. Furthermore, the back portion of a vehicle is used frequently as a place to attach carriers, with the assistance of some semipermanent connector affixed rigidly to the vehicle to support the carrier. Obviously, therefore, there has been a myriad of vehicle attachments for rooftop, side, front or rear end carriers; and the structure, alignment, and positioning of these carriers have generally depended on the exact type of object that the carrier is designed to accommodate.

There is prevalent several problems encountered with the rigid attachment of existing carriers to the motor vehicle. It is not within the scope of this discussion of the prior art to elaborate on all such problems, however, it is expedient to indicate certain of the problems relative to which the subject invention is conceived. One such problem found is that many such carriers involved are affixed by some appropriate bolting mechanism to a portion of the automobile, while others are appended, for instance, to appendages fixedly placed on the vehicle, such as trailer hitches. One problem attendant with the use of bolting means used to affix the additional carrier to the trailer hitch is that one will tend to rotate, ie., slip, around the bolt connection relative to one another. The subject invention is conceived in order to surmount these problems in order to provide an improved adapting device for appendage to the exterior of a motor vehicle. The following objects of the subject invention are directed accordingly.

OBJECTS

By reason of the above indicated status of the existing art, the following are objects of the subject invention:

An object of the subject invention is to provide a versatile adapting device for placement of external carriers externally to a land vehicle;

It is an object of this invention to provide an adapter for attachment to a vehicle which is easily disassembled;

It is an object of the subject invention to provide an adapter for objects which require no independent means to affix the carried object to the carrying platform;

Another object of the subject invention is to provide a carrier adapter that is easily assembled or connected to existing trailer hitch appliances usually appended in projecting fashion to a vehicle;

Yet another object of the subject invention is to provide an improved device for stabilizing attached carriers to an automobile;

Another object of the subject invention is to provide an adapter which is capable of interconnecting two vertically attached carriers;

Another object of the subject invention is to provide a device for stabilizing against lateral rotational movements of a carrier for bicycles which can be attached to an automobile or other land vehicles;

Yet another object of the subject invention is to render a vehicle carrier which is readily assembled without substantial physical difficulty;

Still another object of the subject invention is to provide a carrier attachment apparatus which is simple in structure;

A further object of the subject invention is to provide an improved bicycle carrier attachment adapter that does not require extrinsic holding means in order to keep the carrier in place;

Another object of the subject invention is to provide an immediate appendage adapter;

Still another object of the subject invention is to provide a bicycle carrier adapter that is relatively simple to manufacture and assemble and disassemble;

Another object of the subject invention is to provide an adapter plate to be used between two appliances so that they are adapted to be fixedly affixed to one another by bolting means, so as to keep one member from rotating relative to the other;

A further object of the subject invention is to provide a lightweight carrier which is still durable;

It is an object of this invention to provide an improved object for stabilizing one unit relative to another.

Other and further objects of the subject invention will become apparent from a reading of the following drawings taken in conjunction with the description of the preferred embodiment.

DRAWINGS

FIG. 1 is a top elevational view of a preferred embodiment of the subject invention;

FIG. 2 is a side elevational view of the subject invention;

FIG. 3 is a perspective view of the subject connecting device;

FIG. 4 is a top elevational view of the subject invention showing its application on adapter;

FIG. 5 is a rear elevational view of the subject invention.

DESCRIPTION OF GENERAL EMBODIMENT

The subject invention is a variable purpose adapter mechanism for linking external appendages to a trailer hitch or similar device.

In the general embodiment of the subject invention, such invention comprises a flat plate-like rectangular member, having flanges on opposing edges, which flanges are directed in opposite directions. The flange members are adapted to engage the upper and lower members which are interconnected by the intermediate flange member. Specific elements and aspects of the subject invention will be set forth in the following description of a preferred embodiment of such invention.

DESCRIPTION OF PREFERRED EMBODIMENT

In the following description of a preferred embodiment of the subject invention, there will be a description of only one embodiment within the scope of the subject invention. Therefore, a description of a preferred embodiment of the subject invention shall not be considered as limiting the scope of the invention.

It is to be stressed that in describing the preferred embodiment of the subject invention, the following definitions will be utilized. The word "frontal" will be used in reference to the front area of the object, while the words "posterior" or "rear" will be used relative to directions toward the rear of such device and generally extending towards a rearward direction therefrom. The words "longitudinal central axis" will refer to that axis which extends through the center, as seen in cross-section, of an object from the one end to the other end thereof over its longest extent; or, alternately stated, from one extreme point to the most distal point therefrom. The word "longitudinal" or "longitudinally extending" shall mean a direction extending more generally lengthwise in a given direction than otherwise. The word "transverse" will mean the lateral or width distance over a given object, which will be considered generally perpendicular to the longitudinal central axis of such object. The word "upper" will refer to areas above the ground when the object is in its intended position. The word "lower" will refer to those areas extending towards the ground reference. In this latter respect, the ground reference will be considered level or horizontal.

FIGS. 1, 2, 3, 4 of the drawings show one preferred embodiment of the subject invention which represent an all-purpose adapter mechanism 100, embodying the features of the subject invention. Such adapter apparatus 100 is constructed primarily as an adapting plate between any upper and lower interconnecting members which are joined to one another in a fixed relationship. In the usual application such members are interconnected in a vertical relationship with one disposed over the top of the other. When the two interconnected members are disposed relative to one another about a bolt member or the like, there is a tendency of one member to pivot about the other. The subject invention is adapted to overcome this tendency to pivot.

The primary example of such an application of this invention is one in which an external carrier apparatus is attached for a rigid relationship between a hatch member and the spine of the external carrier. As shown, a rearwardly projecting trailer hitch member 140 is shown in FIG. 4 which is a typical hitch member with which the subject adapter 100 is primarily intended for use.

The carrier apparatus 200 shown partially in the drawings is particularly adapted for carrying various types of objects. It must be noted, however, that the physical structure of this invention can be used to carry various types of objects, not shown, as there are no significant restraints in this regard except for relatively large or heavy objects. As stated above, the carrier apparatus 200 herein can be used on the front of a land vehicle. However, for the purpose of describing a specific embodiment and application, the carrier apparatus 200 is described hereinbelow as being generally preferably appended to the rear portion of a motor vehicle.

The rigidly fixed main hitch member 140 referred to hereinafter as the main hitch member, as shown in FIGS. 4 and 5, is directly connected either permanently or semipermanently to the rear portion of motor vehicle, through a rear bumper or other vehicle part.

The main hitch member bore 336 completely through the upper surface 338 to the hollow interior 328 and a vertical bore 340 extending completely from the lower surface 342 into the hollow interior 328. These two vertical bores 336 and 340 are axially aligned in a vertically direct disposition, such that a vertically disposed retaining bolt 345 can be inserted through both bores 336 and 340 to affix the main support of the main hitch member 140 to carrier 200, as shown in FIG. 5, as more particularly described below. A vertically disposed bore 450 is machined in the carrier portion 200, which bore can be axially aligned with the vertical bores 336 and 340 disposed in the main hitch member 140, as described above. The bolt 345 is pulled upwardly through bores 450, in carrier body 200, and bores 340, and 336 with the head 480 of such bolt secured against the bottom surface of the carrier body 200, as shown. The upper portion of bolt 345 is threaded, as shown in FIG. 5. A wing nut 500 or other suitable securing device with mating threading is secured over bolt 345 to secure the bolt in place.

Referring now to the drawings, and particularly FIGS. 1, 2, 3, and 5, adapter 100 used to keep the main hitch member 140 from rotating relative to the carrier 200 and is emplaced between the lower surface of the main hitch member 140 and the upper surface of the carrier 200, as shown in FIG. 5. More particularly, the adapter 100 is sandwiched between the main hitch member 140 and the carrier. Such adapter 100 is essentially comprised of a flat rectangular plate 600 of preferably metallic composition and of a generally rectangular disposition, with reverse flanges 620 and 628 disposed on opposite edges of the rectangular plate 600 as more particularly represented in FIGS. 1, 2, and 3. More specifically, the adapter 100 is comprised of a rectangular plate 600 with a rectangular flange member 620 on the one edge 710, extending vertically downwardly in a plane which is perpendicular to the plane defined by the upper surface 800 of the rectangular plate 600. The opposite flange 628 extends vertically upward from sides 720 in a perpendicular direction as shown in FIG. 3.

A vertical bore 850 extends completely through the rectangular plate 600, as shown, and the most preferred location of such bore is in an asymmetrical position, or more particularly a position that is off center, wherein the center of the bore is closer to sides 880 and 720, as compared to the distances to respective opposing sides 890 and 710, as shown in FIG. 1. More specifically, the bore 850 is not preferably located in the center of the plate 600, but is located off center for reasons hereinafter set forth. In the preferred embodiment of the subject invention, the bore 850 is preferably shaped in an oblong configuration when viewed from a top elevational view, or the bore can be rounded. In the preferred embodiment of the subject invention, the adapter 100 is shown to be comprised of a rectangular member, although this configuration is not considered to be critical, so long as the opposing flange members 620 and 628 are able to perform their function as stated below.

As stated, the adapter 600 is emplaced, as shown in FIG. 5 between the main hitch member 140, as shown in FIG. 5, and the carrier 200 and is emplaced so that the vertical flange member 620 is secured downwardly along the left side of the carrier 200 and the opposite flange 628 extends securely up along the right vertical side of the main hitch 140, as shown, with the bore 450 aligned vertically with bores 336, 340 and so that the bolt 345 can penetrate for securing purposes all such bores simultaneously. The adapter 100 in this embodiment functions to hold the main hitch member 140 firmly against and aligned with the carrier assembly 200. This helps the overall stability of the carrier unit 200.

It is to be noted that the invention described herein possesses versatile interconnecting attributes which enables it to be used as an interconnector for a wide range of paired members disposed against one another in a fixed relationship. Therefore, the subject invention is not too limited to the sole embodiment described herein. More generally, the subject invention in the form of the adapter plate shown and described above, can be utilized to stabilize two members joined together through a common bolt member and locked with a retaining member, such as a nut locking the bolt in place. There is a tendency for such two conjoined members to pivot relative to one another. The subject invention can function to prevent such two members, of any type of function, from pivoting relative to one another.

I claim:

1. An adapter device for stabilizing two members relative to one another in order to prevent pivotal movement, said device comprising:
   (a) a plate member having an upper surface and a lower surface with a bore in said plate extending from the lower surface to the upper surface, and said plate having four edges forming the perimeter of said plate disposed on respective opposing sides of said plate, and wherein the bore in said plate is disposed in a position offset from the geometrical center of said plate toward one corner of said plate
   (b) first and second flange members disposed along the full length of opposing edges of said plate member, wherein the first flange member is disposed away from the upper surface of said plate in a direction opposite to the direction of said second flange member.

* * * * *